United States Patent [19]

Hertrich

[11] Patent Number: 4,788,465
[45] Date of Patent: Nov. 29, 1988

[54] ARMATURE FOR DC MOTOR

[75] Inventor: Friedrich R. Hertrich, Boulder, Colo.

[73] Assignee: Digital Equipment Corporation, Maynard, Mass.

[21] Appl. No.: 95,530

[22] Filed: Sep. 10, 1987

[51] Int. Cl.⁴ .............................................. H02K 1/24
[52] U.S. Cl. .................. 310/269; 310/49 R; 310/216; 310/218; 310/194
[58] Field of Search ............... 310/49 R, 46, 156, 216, 310/218, 254, 258, 259, 269, 177, 179, 190, 192, 194

[56] References Cited

U.S. PATENT DOCUMENTS

| | | | |
|---|---|---|---|
| 794,998 | 7/1905 | Mott | 310/218 X |
| 796,702 | 8/1905 | Churchward | 310/218 |
| 879,927 | 2/1908 | Treat | 310/218 |
| 2,172,191 | 9/1939 | Denman | 310/216 |
| 2,229,977 | 1/1941 | Kenyon | 310/194 X |
| 2,449,506 | 9/1948 | Pollard | 310/209 |
| 3,153,157 | 10/1964 | Rabe | 310/46 |
| 3,441,760 | 4/1969 | Collens | 310/91 |
| 3,634,707 | 1/1972 | Tillner et al. | 310/172 |
| 3,809,938 | 5/1974 | Sjoberg et al. | 310/254 |
| 4,280,072 | 7/1981 | Gotou et al. | 310/67 R |
| 4,583,015 | 4/1986 | Toshimitsu | 310/187 |
| 4,672,253 | 6/1987 | Tajima et al. | 310/269 |
| 4,698,537 | 10/1987 | Byrne et al. | 310/168 |

Primary Examiner—Mark O. Budd
Attorney, Agent, or Firm—Fish & Richardson

[57] ABSTRACT

An armature for a DC motor includes a plurality of circumferentially spaced armature segments having salient poles with arcuate surfaces and air pockets formed within the poles adjacent to but not intersecting the surfaces, sized and located to reduce cogging due to variations in reluctance. The armature segments are preferably bridged by flux links carrying prewound electrical coils arranged in a circular path. Corresponding lamina in each armature segment are formed of a unitary stamping in which the segments are interconnected by removable flexible joints.

17 Claims, 4 Drawing Sheets

ARMATURE FOR DC MOTOR

BACKGROUND OF THE INVENTION

The invention relates to armature design for low cog high efficiency DC motors.

DC motors, particularly of the brushless variety, are used in a number of applications requiring precisely constant rotation, for example, in magnetic tape or disk drives. A typical brushless DC motor has an inner rotor with a ring of alternately permanently magnetized segments inside a stationary circular array of laminar pole pieces carrying a plurality of electrical coils usually wound about radial axes, and electrically connected in a three-phase delta circuit. Conversely a DC motor with a commutated rotor usually has the permanent magnets arranged in a stationary ring outside the coil carrying poles forming the rotor. In any case, there are two distinct parts to this type of DC motor: an electromagnetic part and a permanent magnet part. Various motor designs may employ either part as the rotor. The term "armature" has come to mean that part of an electric rotating machine that includes the main current-carrying winding in which the electromotive force produced by magnetic flux rotation is induced. An armature may be rotating or stationary. On the other hand, the term "field" is used in contrast to armature to refer to a permanent magnet or electromagnet producing a constant strength magnetic field in an electric rotating machine. The field may be on the stator or the rotor. The terms armature and field as used herein are thus employed to distinguish between two relatively rotatable members, one of which (the field) is predominantly characterized by a constant strength magnetic field and the other of which (the armature) is characterized by the presence of electrical coils which, in the case of a motor, are fed current of varying magnitude to produce a varying magnetic field.

To achieve high efficiency, compact DC motors require armature poles with saliencies which project toward the field magnets so that the surfaces of the saliencies and field magnets are very close. This juxtaposition makes the motor more efficient at converting electrical energy to torque. However, it also makes the motor more vulnerable to cogging, a mechanical force which manifests itself as a resultant torque through which the rotor seeks to hold relatively stable positions of minimum reluctance. Cogging is most prevalent in the absence of active energization of the armature, particularly during deceleration.

Another problem area with small high efficiency DC motors is the design and manufacture of the armature windings and cores. Conventional designs complicate manufacture, unduly limit the space for the coils, and exhibit undesirably high inductance during switching of phases.

SUMMARY OF THE INVENTION

A general feature of the invention is an armature for a DC motor having at least one salient pole with a pole face, at least one internal region within the pole exhibiting different reluctance from that of the interior of the pole immediately surrounding the internal region, the internal region being located adjacent to the pole face in a position which is selected to affect the effective relative reluctance offered by the pole over an external path traversing the location selected to minimize variation of the relative reluctance along the path. Preferred embodiments of the invention include arranging several poles in a circle with respective pole faces circumferentially spaced with the internal regions positioned at angular locations selected to minimize variation in relative reluctance along a circular external path by the pole faces. The internal regions are preferably spaced along a circular path with the angle between adjacent ones of the regions being evenly divisible into $360/n°$, n being the number of poles.

In the preferred embodiment of this general feature, the internal regions are provided by forming pockets within the poles. The pockets are occupied by material of greater reluctance than the surrounding material of the pole and preferably comprise apertures forming air pockets. Each pole may be formed of a stack of laminations in which pockets or apertures are defined transversely through the laminations.

Another aspect of the invention features an armature for a DC motor having a plurality of circumferentially spaced armature segments arranged in a circle with a plurality of flux links bearing prewound electrical coils bridging adjacent ones of the segments. Opposite ends of the flux links are received in mating recesses or notches formed in opposed sides of adjacent ones of the armature segments. According to preferred embodiments of this feature of the invention the coils may be arranged along a circular path and adjacent pairs of armature segments may have opposed parallel sides to accommodate the coil. The flux links are preferably trapezoidal so as to fit in tapered notches. The armature segments are preferably formed of a stack of laminations in which each corresponding layer of all of the armature segments is formed of a single unitary stamping. Adjacent armature segments in each lamination are interconnected by a removable flexible joint assisting in assembly. Insertion of the flux links is facilitated by stamping each lamina with a diameter substantially larger than the installed diameter.

A further aspect of the invention is the employment of the foregoing armature in a DC motor having a field member with a plurality of circumferentially juxtaposed coaxial permanent magnet poles of alternating radial polarity, the field member and armature being coaxially mounted for relative rotation in operative juxtaposition so that the apertures formed in the armature poles increase the reluctance seen by the field member at a position corresponding to the angular location of the air pocket so as to minimize variations in reluctance with relative angular rotation. The angle between the air pockets as seen from the axis of rotation should be evenly divisible into $360/n°$, n being the number of armature poles but not evenly divisible into any integer multiple of $360/q°$, q being the number of field poles. In the preferred embodiment, the motor has six armature poles and eight field poles and the angle between adjacent air pockets in the armature poles is either 12° or 20°.

The provision of pockets or regions of increased reluctance within the armature poles serves to eliminate the reluctance minima which give rise to cogging in DC motors. The preferred air pocket system is compatible with an armature design providing for straight flux links bridging the armature segments in a way which provides more space for coils than previous designs. Moreover, the straight flux links allow the use of conventional high speed prewound coils. Moreover, when switching coils, the flux tends to be maintained nearly constant thus lowering the motor inductance during switching.

Other features and advantages will be apparent from the following description of the preferred embodiments and accompanying drawings.

DESCRIPTION OF THE PREFERRED EMBODIMENTS

The drawings are briefly described as follows.

STRUCTURE

The embodiments illustrated in this application are designed specifically for a magnetic tape drive for multiple track tape cartridges used for mass storage of digital data in computers. In this design, the electrical coil-bearing armature is the stator and the permanent magnet field member is a rotatable core disposed inside the armature forming the rotor. The electrical connections to the armature are made directly or "brushlessly" because it is stationary and there are no electrical connections to the rotor.

Figure 1:
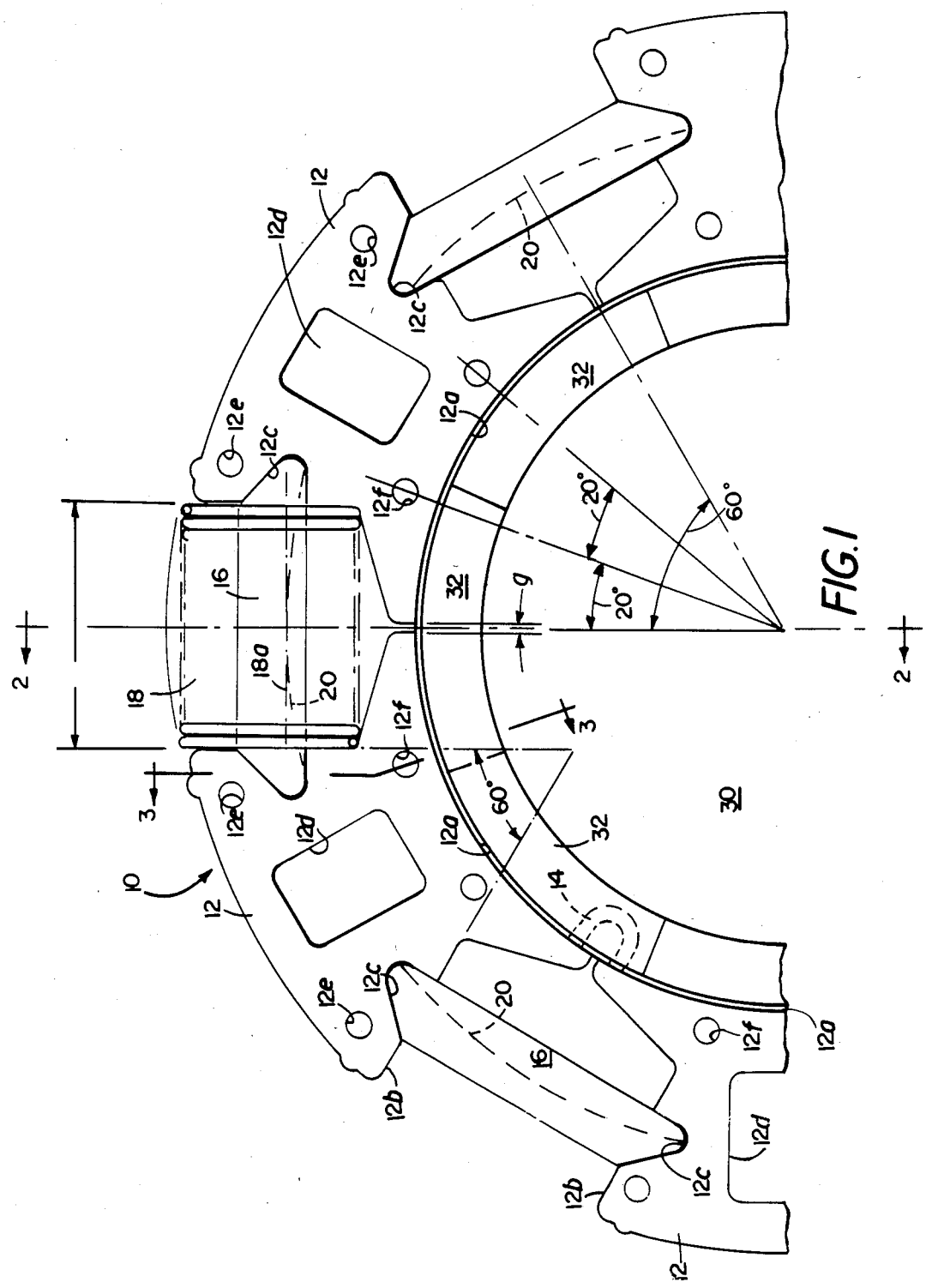
FIG. 1 is a partial plan axial view of a brushless DC motor according to the invention.
Figure 3:
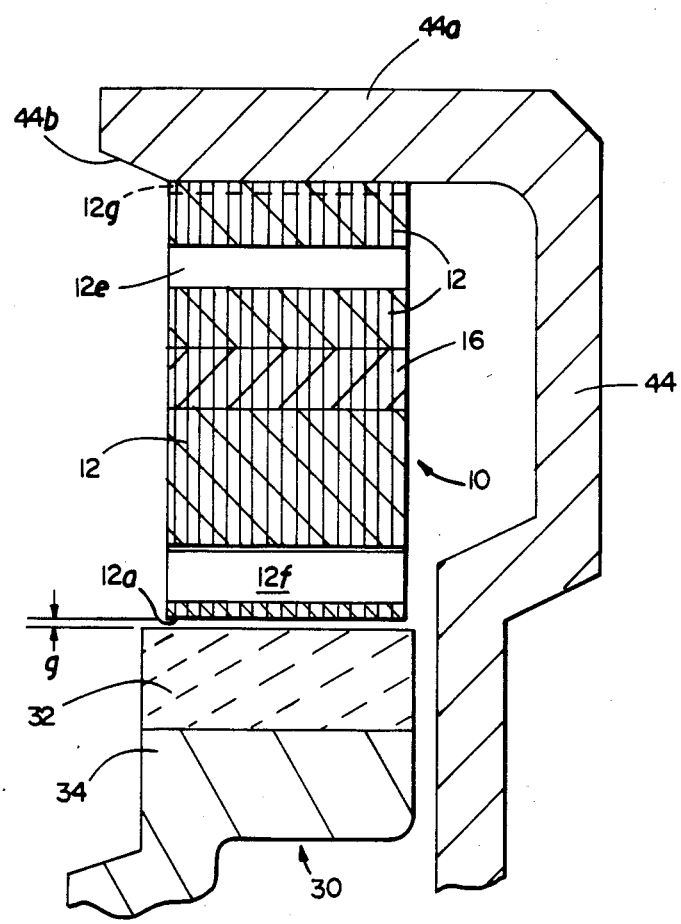
FIG. 3 is a partial sectional view of the motor illustrating an air pocket in the salient pole of the armature taken along lines 3—3 of FIG. 1.
Figure 4:
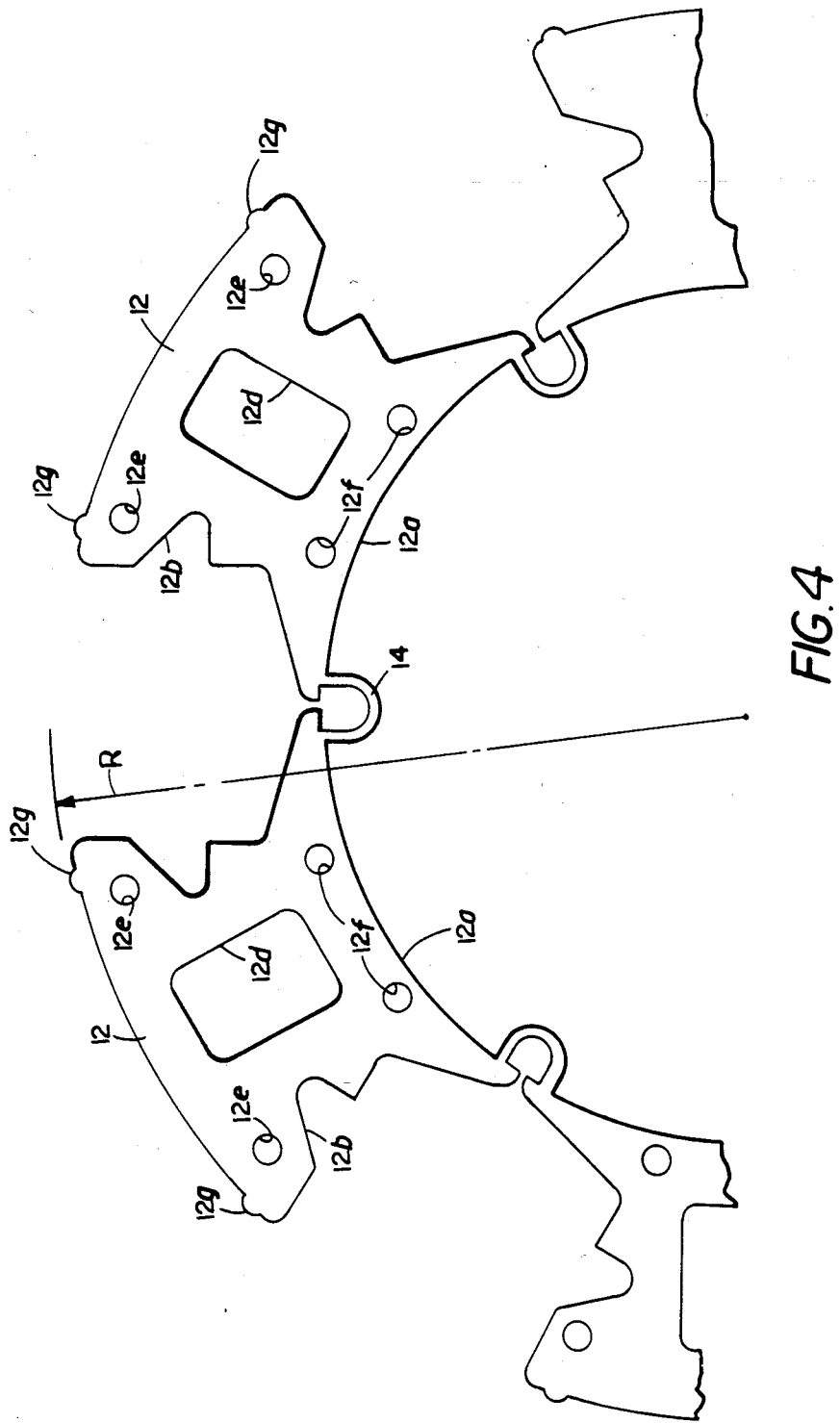
FIG. 4 is a partial plan view of a stamping of a lamina for the armature segments of the motor of FIG. 1.

As shown in FIGS. 1 and 4, the armature 10 includes six identical armature segments 12, each having a partial cylindrical inner surface 12a arranged in gapped coaxial alignment to form a central cylindrical space. Each armature segment 12 comprises a stack of twenty to thirty lamina as indicated in the sectional views of FIGS. 2 and 3. The respective laminae of all of the armature segments 12 are coplanar and are formed collectively in a unitary stamping as shown in FIG. 4. Each lamina is made of silicon ("transformer") steel and has a thickness of about 0.020 inch. In the original stamping as shown in FIG. 4, laminae for adjacent armature segments are joined like paper dolls by U-shaped flexible links 14 which are all removed during assembly as described below.

Figure 2:
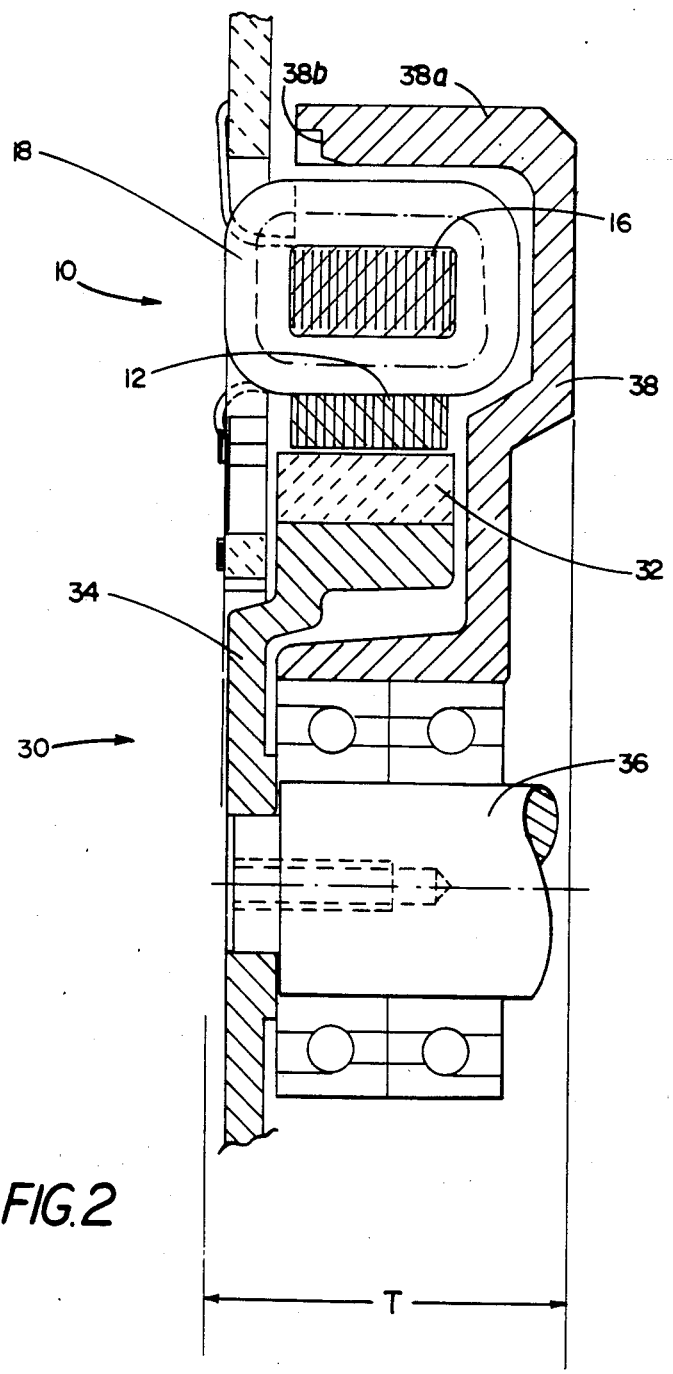
FIG. 2 is a partial sectional view of the motor taken along lines 2—2 of FIG. 1.

Adjacent armature segments 12 have opposing parallel sidewalls 12b with opposed tapered notches 12c. Six similarly laminated trapezoidal link sections 16, each bearing a prewound continuous electrical coil 18, are received in the respective tapered notches 12c. The link sections 16 are aligned with the sides of a regular hexagon centered on the rotor axis. The axes 18a of the coils 18 are thus all tangential to the circular path 20 interconnecting the centers of each link section 16 as shown in FIG. 1. The motor coils 18 are prewound on high-speed (e.g., 2,000 r.p.m.) production eguipment and may use square wire for minimizing unused air space and for obtaining the lowest possible DC resistance for the highest number of turns. The link sections 16, rectangular in cross-section as shown in FIG. 2, are inserted into the prewound coils 18. Each armature segment 12 has a plurality of holes for weight reduction and tooling, namely, a large rectangular window 12d and two outer circular holes 12e. Located near the inner circumference of each armature segment 12 are a pair of reluctance modifying air pockets 12f in the form of circular apertures spaced 20° from the gap between the adjacent armature segments as shown in FIG. 1.

The field member or rotor 30 is mounted coaxially within the cylindrical space defined by the armature segments 12. The rotor 30 carries eight cylindrical permanent magnet segments 32. As shown in FIGS. 1 and 2, the segments 32 are alternately radially magnetized and arranged in juxtaposed circumferential alignment. The clearance between the outer cylindrical surface of the rotor 30 and the inner cylindrical surface 12a of each armature segment 12 is as small as is practical to manufacture in order to increase the efficiency of the motor by enhancing the coupling between the armature 10 and field core 30. As shown in FIG. 2, magnets 32 are supported on a pan-shaped rotor element 34 which is affixed to a coaxial solid drive shaft 36 journaled in an annular motor housing 38. A depending outer flange 38a of the housing forms a compartment in which the armature 10 is received.

The original diameter of one armature lamina comprising six segments as shown in FIG. 4, as punched by the stamping die (not shown), is slightly larger than the diameter after installation. In a prototype having a three inch finished diameter for the armature 12, the laminations are punched at a diameter approximately 0.020 inch larger than the finished diameter. As a result, approximately 0.013 inch of circumferential clearance is available for easy installation of the flux links 16.

The inner rim of housing flange 38a is formed with a groove 38b which is engaged by a cylindrical tooling fixture (not shown). The fixture has a conical lead in for pressing the oversized lamination stack into the motor housing 38 after links 16 with coils 18 have been inserted.

Each armature segment 12 has a pair of axial lands 12g. All twelve axial lands are equally spaced 30° apart. The lands 12g permit a wider range of tolerances for pressing the segments 12 and links 16 together during installation. After the armature 10 has been installed, the flex joints 14 are removed by broaching or other suitable means. As shown in FIG. 3, a modified housing 44 has a depending flange 44a with a built-in conical lead-in surface 44b formed on the inner edge of the rim of the flange 44a. This is intended to allow the housing 44 to act as an assembly fixture by assisting the pressing of the armature 10 into place.

The coils 18 are electrically interconnected in opposed relationship. Thus, two opposite coils 18 (not shown) are connected in series such that when energized they produce parallel magnetic fields in opposite directions. Opposite pairs of the other coils 18 are similarly connected. The coil pairs are then connected in a conventional delta circuit or in a bipolar driven y-connection (not shown).

A prototype motor of the foregoing description has an axial thickness T (FIG. 2) of approximately 0.75 inch to accommodate mounting on a printed circuit board and exhibited a DC resistance of 2.5 ohms. Even with an extremely reduced air gap between the rotor 30 and armature 10 and using rare earth magnets for the field magnets 32, low cogging was exhibited producing reduced torque ripple. Low cogging is achieved partly by making the gaps G between adjacent armature segments narrow (e.g., 0.022 inch). In addition, however, the air pockets 12g spaced between the gaps offer a means of controlling the reluctance path so that the total reluctance between the field rotor and armature is constant for all angular positions of the rotor 30.

The design of the armature with segments and separate, coil-carrying straight flux links provides more space for coils than previous designs. Aligning the coils along a circular path 20 has an additional advantage when switching coils. Since coil flux tends to link through the armature, the magnetic flux energy remains nearly constant as one phase is turned off and another phase is turned on. As a result, the motor inductance during switching is relatively low. The flux link design allows the use of conventional high-speed coil winding equipment to make prewound coils for assembly on straight cores 16, which lowers the cost of manufacture and simplifies assembly.

The foregoing description is intended for purposes of illustration. Many other embodiments of the invention are also within the following claims. Variations can be made on this specific design without departing from the principles of the invention, which may also be applied to diverse designs for the same or different applications. For example, the air pockets in the preferred embodiment shown herein are axial cylindrical apertures whose axes are parallel to the rotor axis and perpendicular to the laminations. However, the shape of the air pockets can be varied and can encompass irregularly shaped openings and recesses through some but not all of the laminations. One advantage, however, of the present design is that each armature lamina can be exactly the same. In any case, the air pockets define internal regions of different reluctance from that of the surrounding material. Various applications of this principle can be made besides those described herein.

The angle between adjacent apertures in motor applications of the type described herein should nevertheless be evenly divisible into 360/n°, n being the number of armature poles, and not evenly divisible into any integer multiple of 360/q°, q being the number of field poles. For example, in the present embodiment where there are eight field poles and six armature poles, the angle between adjacent apertures could be 12° instead of 20°, in which case, there would be four air pockets per armature segment rather than two. In the present design, using two air pockets per armature segment, the inner diameter of the air pocket holes is approximately 0.060 inch and the holes are centered approximately 0.050 inch radially from the cylindrical surface 12a of the segment 12. These dimensions can be varied as necessary to minimize reluctance variation. The present invention also offers a convenient way to test various dimensions for the air pockets for optimization by punching a large number of blanks and then simply drilling sets with holes of different sizes and radial locations.

The invention, while described in a brushless DC motor is also applicable to other DC motor designs.

What is claimed is:

1. An armature for a DC motor having a rotor axis, comprising
    a plurality of circumferentially spaced armature segments arranged in a circle,
    a plurality of prewound electrical coils, and
    a plurality of flux links carrying respective ones of said electrical coils, said flux links bridging adjacent ones of said segments and being approximately aligned along a circular path centered on the rotor axis.

2. The armature of claim 1, wherein said coils are arranged along said circular path.

3. The armature of claim 1, wherein adjacent ones of said segments have adjacent sides with opposed notches, each flux link being arranged between adjacent ones of said armature segments with the ends of each flux link received in the respective pair of said opposed notches.

4. The armature of claim 3, wherein the adjacent sides of each adjacent pair of armature segments are parallel.

5. The armature of claim 4, wherein said flux links are trapezoidal and said notches are tapered.

6. The armature of claim 2, wherein the axis of each coil is tangential with respect to said circular path.

7. The armature of claim 1, wherein said armature segments are formed of a stack of laminations.

8. The armature of claim 7, wherein the stamping for each lamina has a diameter substantially larger than the installed diameter.

9. The armature of claim 7, wherein adjacent armature segments in each lamination are interconnected by a removable flexible joint assisting in assembly.

10. The armature of claim 9, wherein said circle of armature segments is in the form of an annulus, said flexible joint joining adjacent segments at the inner periphery of said annulus.

11. The armature of claim 1, wherein said segments have arcuate surfaces circumferentially aligned in gapped juxtaposition.

12. The armature of claim 11, wherein said segments have apertures defined adjacent to but not intersecting said arcuate surfaces at angular locations to minimize variation in reluctance.

13. The armature of claim 1, wherein the axes of said coils are approximately tangential to said circular path.

14. The armature of claim 1, wherein said links are aligned with the respective sides of a regular polygon centered on the rotor axis.

15. A DC motor with a rotor axis having reduced cogging torque, comprising
    a field member having a plurality of circumferentially juxtaposed coaxial permanent magnet poles of alternating radial polarity, and
    an armature having a plurality of poles with coaxial surfaces, each pole being formed of a stack of laminations, said field member and armature being coaxially mounted with respect to said rotor axis for relative rotation in operative juxtaposition,
    each said armature pole having a plurality of axial apertures adjacent said coaxial surface continuously bounded by the respective pole in the radial direction relative to the axis of rotation for increasing the reluctance seen by the field member at a position corresponding to the angular location of said aperture, said apertures being arranged along a circular path centered on the rotor axis, adjacent ones of said apertures being spaced by a predetermined angle related to the number of said armature and field poles, the dimensions of said apertures being chosen to reduce cogging torque, the angle between said apertures being evenly divisible into 360/n°, n being the number of aperture poles and not evenly divisible into any integer multiple of 360/q°, q being the number of field poles.

16. The motor of claim 15, wherein there are six armature poles with two of said apertures in each armature pole.

17. The motor of claim 16, wherein there are eight field poles and the angle between adjacent apertures in said armature poles is either 12° or 20°.

* * * * *

UNITED STATES PATENT AND TRADEMARK OFFICE
CERTIFICATE OF CORRECTION

PATENT NO.  : 4,788,465
DATED       : November 29, 1988
INVENTOR(S) : Friedrich R. Hertrich It is certified that error appears in the above-identified patent and that said Letters Patent is hereby corrected as shown below:

Column, line 35, after "is" insert --predominantly--.

Column 1, line 67, after "the" insert --pole face. The region is preferably positioned at a--.

Signed and Sealed this

Twelfth Day of December, 1989

Attest:

JEFFREY M. SAMUELS

Attesting Officer

Acting Commissioner of Patents and Trademarks